UNITED STATES PATENT OFFICE.

ALEXANDER R. WYETH, OF WEST MIDDLETOWN, PENNSYLVANIA.

IMPROVEMENT IN TANNING.

Specification forming part of Letters Patent No. 31,640, dated March 5, 1861.

*To all whom it may concern:*

Be it known that I, ALEXANDER R. WYETH, of West Middletown, in the county of Washington and State of Pennsylvania, have invented a new and Improved Process for Tanning Skins and Hides; and I do hereby declare that the following is a full, clear, and exact description of the same.

To enable those skilled in the art to fully understand my invention, I will proceed to describe it.

I make a soak of soft or rain water, in which I dissolve one pound caustic potash and two pounds sal-soda. In this the hides and skins are put to soften, and are to remain in it until the gelatine of the hide is equally softened throughout, the solution being kept at blood-heat, or 100° Fahrenheit. I then break flesh in the usual manner and work them out thoroughly. I now hang them in a suitable sweat-room, which is kept at a temperature of about 60° Fahrenheit, and in this apartment the skins remain until the hair will come off easily. They are then unhaired in the usual manner, and after unhairing I subject them to a thorough rinsing in fresh cold water, and then work them on the beam in the well-known manner. I now again suspend them in the sweat-room, the temperature of which is still kept at about 60° Fahrenheit, and subject them to the steam or vapor which rises from the combustion of equal parts of wet spent tan-bark, damp horse-dung, and damp rotten wood. This vaporizing process I employ instead of bating, also to purify the skins and cause them to tan quickly. After being vaporized, I work them thoroughly again, and then subject them to a compound tan-liquor, which is composed as follows, to wit: Steep five hundred and ten pounds of hemlock or chestnut-oak bark; fifty pounds Sicily sumac; twenty-five pounds divi-divi in a sufficient quantity of rain-water to receive easily sixty sides or two hundred calf-skins. In this solution dissolve five pounds alum. I now handle the skins while in the liquor frequently. As the skins thus immersed take up the tanning matter of the liquors the latter must be strengthened with the following liquor: In a sufficient quantity of water dissolve one bale of japonica, twenty pounds Glauber's salt, and fourteen pounds common salt, with which strengthen the above-named tanning-liquor from time to time, as required, handling the skins frequently till fully tanned.

I do not claim, broadly, the smoking of skins or hides, for I am aware that it is not new; but, Having described my invention, I claim—

The within-described process for treating hides or skins, consisting in first soaking them in a warm solution of potash and sal-soda, then, after sweating, rinsing, working, and sweating, subjecting them to the vapor of spent damp tan-bark, damp horse-dung, and rotten wood, then soak them in a tanning-liquor composed of bark solution, sumac, divi-divi, and alum, which liquor is afterward strengthened with japonica, Glauber's salt, and common salt, all in the manner and in the proportions herein set forth and described, for the purpose specified.

ALEX. R. WYETH.

Witnesses:
WM. M. BUSHFIELD,
GEORGE DODD.